Figure 1:
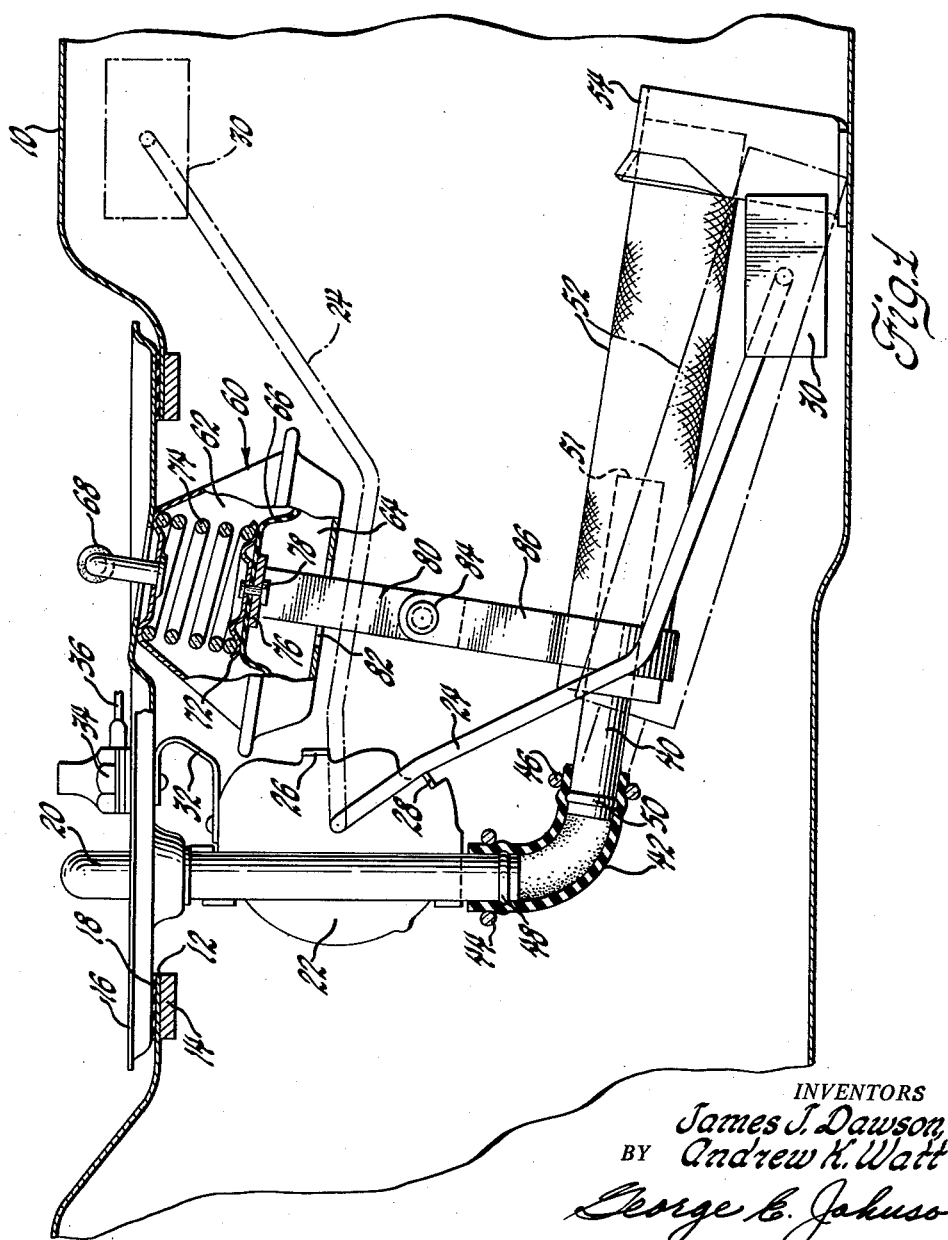

INVENTORS
James J. Dawson, &.
Andrew K. Watt
BY
George E. Johnson
ATTORNEY

United States Patent Office 3,031,011
Patented Apr. 24, 1962

3,031,011
LIQUID FUEL RESERVE SYSTEMS
James J. Dawson, East Lansing, and Andrew K. Watt, Lansing, Mich., assignors to General Motors Corporation, Detroit, Mich., a corporation of Delaware
Filed Nov. 25, 1959, Ser. No. 855,323
1 Claim. (Cl. 158—46.5)

This invention relates to fuel systems and more particularly to systems for selectively supplying liquid fuel from main or reserve reservoirs of supply such as different zones or levels in tanks.

In automotive vehicles, provisions have been heretofore made to shift the effective level of the inlet ends of fuel suction lines within tanks with the thought in mind to hold a fuel supply in reserve for emergency use. These provisions have been characterized by their complexity or their inconvenient mode of operation.

An object of the present invention is to provide an improved liquid fuel reserve system of simple and reliable construction and which is convenient to operate.

A feature of the invention is a vertically movable inlet for a suction line, the inlet being adapted to be positioned at predetermined levels in a reservoir such as a tank by remote control. Another feature is a vertically movable suction inlet line with power means for placing the line at selected levels within a liquid reservoir.

These and other important features of the invention will now be described in detail in the specification and then pointed out more particularly in the appended claim.

Figure 2:
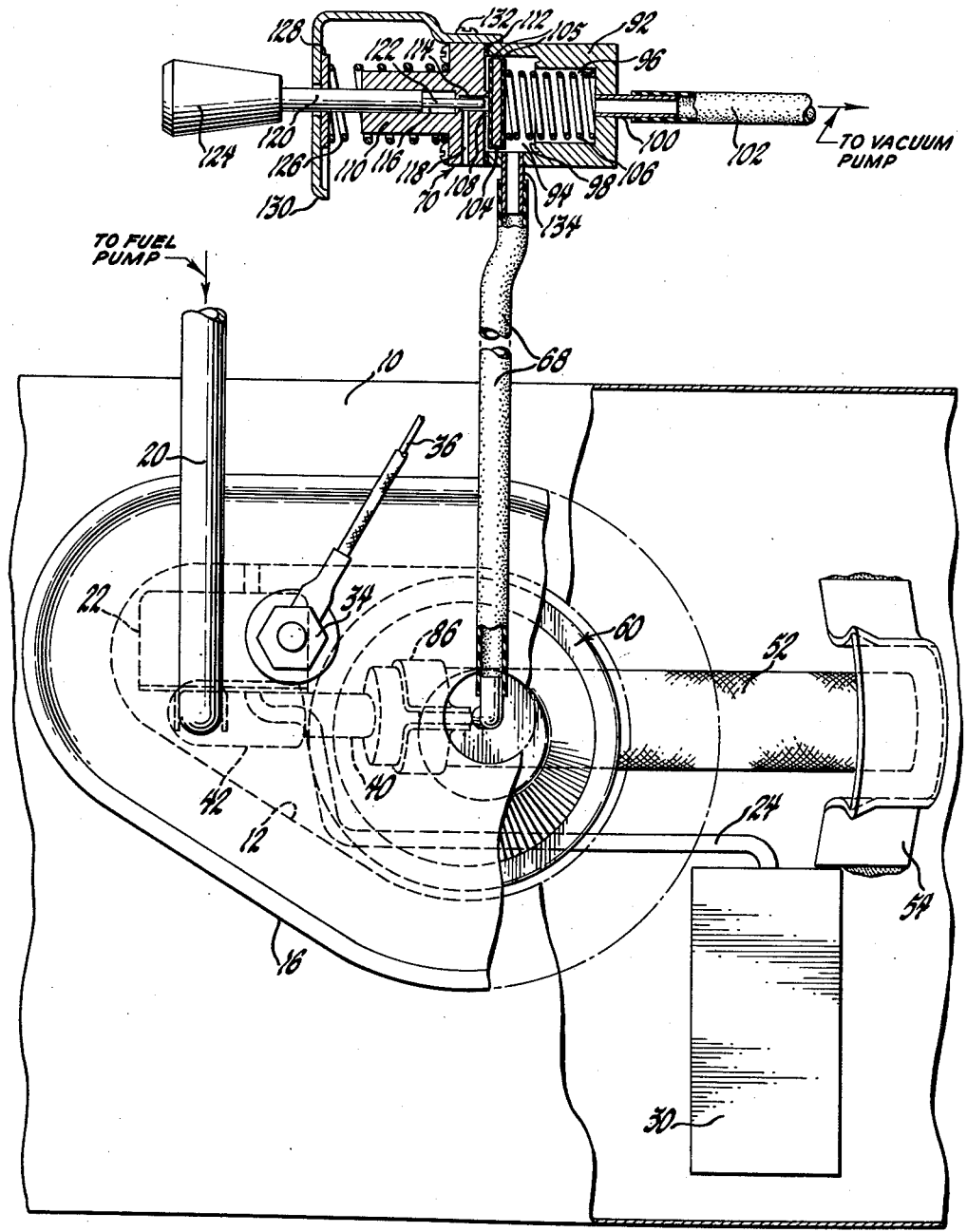

In the drawings:

FIGURE 1 is a sectional view taken through the midportion of an automobile fuel tank in which one embodiment of the present invention is installed; and FIGURE 2 is a plan view of the tank shown in FIGURE 1, a portion of the tank being broken away and a remote valve control arrangement also being disclosed in section.

The drawings depict a fuel tank 10 having an opening 12 in its topside. The margin of the opening is reinforced by means of a strap 14 welded to the tank. A cover plate 16 is attached to the tank by means not shown and tightly seals the opening 12 by means of an interposed gasket 18. The cover plate is provided with a discharge conduit 20 which is fastened to and penetrates the cover plate in leak-tight fashion. The conduit 20 extends downwardly into the tank and supports a housing 22 in the tank and which in turn pivotally supports a float arm 24. Stops 26 and 28 are provided on the housing to determine the limits of motion for the float arm 24. The free end of the arm 24 is pivotally joined to a float 30. Bracket 32 is fixed to the top of the casing 22 and also is joined to a terminal 34 which is insulated from the cover 16 but passes through it. It will be appreciated that the casing 22 in cooperation with the float 30 constitutes a sending unit whereby a signal pertaining to the liquid level may be imparted through the use of an electric current passing through the bracket 32 into the terminal 34 and by way of a line 36 to a gage not shown. A further description of this sending unit is not given as the details thereof do not relate to the present invention. It suffices to say, however, that a sending unit of this type is disclosed in the United States Patent 1,902,933, granted in the name of Joseph Zubaty, on March 28, 1933. This patent shows a conventional sending unit in combination with a fuel suction line leading from a level immediately above the bottom of a tank.

The present invention relates to a system whereby a reserve supply of fuel may be availed of when a main supply has been consumed. In order to make this possible, applicant has provided a conduit portion 40 which is vertically movable within the tank 10 to receive liquid from different levels therein. One end of this conduit portion is connected to the lower end of the discharge conduit 20 by means of a flexible hose 42. Spring clamps 44 and 46 cooperate with ridges 48 and 50 on the respective conduit portions to hold the hose in firm relation. The conduit portion 40 has an open end 51 which is surrounded by a cylindrical filter element 52. The latter is slipped over the conduit portion 40 and held thereon by friction or other means. This filter 52 may take various forms. It may be of wire or plastic mesh or of some other filtering material, its function being merely to insure that no sediment is drawn from the tank 10 up through the conduit 20. A stop strap 54 is welded to the bottom of the tank 10 to determine the upper limit to which the filter 52 and the conduit portion 40 may go as permitted by the flexible conduit 42.

Suspended from the underside of the cover 16 is a pressure actuated motor 60. The interior of this motor is divided into two compartments 62 and 64 by means of a flexible diaphragm 66. A conduit 68 is connected to the motor 60 from an interior source such as a vacuum supply valve 70 indicated in FIGURE 2. Such a valve is mounted on the vehicle instrument panel. One side of the diaphragm 66 engages a spring biased plate 72. A coil spring 74 extends from the plate 72 to the interior top portion of the motor 60. The underside of the diaphragm 66 is held against a flange 76 by means of a rivet 78 passing through the flange, diaphragm and plate 72. The flange 76 is integral with a downwardly extending link 80 which passes freely through an opening 82 of the motor casing. The lower end of the link 80 is joined by means of a pivot pin 84 to the parallel ends of a strap 86 which tightly encompasses one end of the filter 52.

The valve 70 includes a main body 92 which defines a chamber 94. The latter has a restricted portion 96 which terminates with an annular valve seat 98. The chamber 94 connects at one end with a nipple 100 and that nipple in turn is connected to a conduit 102 leading to a source of vacuum such as a vacuum pump. A valve member 104 with oppositely disposed resilient facings 105 is located in the chamber 94 and is biased by means of a coil spring 106 towards a valve seat 108 formed on a valve body portion 110. The latter is fixed to the main body 92 with a gasket 112 interposed to form a seal. The valve seat 108 surrounds a small port 114 which communicates with a larger diameter chamber 116 and also with a smaller air vent 118. A plunger 120 is slidable in the chamber 116 and is provided at one end with a restrictor pin 122 which extends into the port 114 with a slight clearance. An exposed end of the plunger 120 is provided with a hand knob 124 and a spring 126 is arranged to urge the plunger 120 towards the left as viewed in FIGURE 2 by action against a washer 128 fixed to an intermediate portion of the plunger. The extreme outer movement of the plunger 120 is determined by a support bracket 130 which is fixed to the valve body portion 110 by means of a screw 132. A nipple 134 serves to connect the conduit 68 with the chamber 94 of the valve.

With a normal supply of liquid fuel in the tank 10, such fuel may be withdrawn through the filter 52 and by way of the conduit portion 40 to the conduit 20 leading to the fuel pump. The valve arrangement of FIGURE 2 will have its parts positioned as shown in that figure with the result that vacuum is applied by means of the lines 102 and 68 to the chamber 62 of the vacuum motor 60. The diaphragm 66 will, therefore, be urged upwardly to compress the spring 74 and hold the filter 52 up against the stop 54.

Normally, when the fuel level as indicated by the gage becomes low, the operator would refuel. In the event, however, that the fuel level becomes low without notice of the operator, the engine will falter as if stalling from lack of fuel. The operator is able to switch his inlet line to a secondary source of supply which constitutes a lower level or zone in the tank 10. In order to bring about such a switch, the operator pushes the knob 124 to the right and from its position as viewed in FIGURE 2 with the result that the pin 122 will urge the valve member 104 to the right and against the annular valve seat 98. The vacuum applied through the conduit 102 will serve to retain the valve member 104 against the seat 98 and against the force of the spring 106. As a result, the vacuum chamber 62 of the motor 60 will be open to atmosphere by way of the conduit 68, the port 114 and the vent 118. As a consequence, the pressure on both sides of the diaphragm 66 will be equal and the spring 74 will urge the diaphragm downwardly until the filter 52 reaches the bottom of the tank or until the diaphragm reaches the bottom end of the stroke. The operator then has his secondary supply of fuel available.

When the engine is stopped as in the ordinary course of events for the purpose of refilling the tank 10, a loss of vacuum will cause the spring 106 to be effective in moving the valve member 104 to the seat 108 for normal operation.

We claim:

A liquid fuel reserve system including a reservoir such as a gasoline tank in an automotive vehicle, said tank having an opening and a cover plate therefor, a fuel discharge conduit mounted on said cover plate and extending into said reservoir and having one end movably mounted within the latter, a motor located within said reservoir and fixed to said cover plate and having a driven member linked to said one end, said motor having a vacuum chamber partially defined by a diaphragm which is connected to said driven member, spring means in said vacuum chamber and acting downwardly against said diaphragm, said driven member being sufficiently rigid to transfer up and down motion of said diaphragm to said one end, a vacuum source, a valve outside said reservoir and having ports, one of said ports leading to the atmosphere, a second of said ports being connected to said vacuum source, the said one port being normally closed as the second port is normally open to apply a vacuum to said vacuum chamber, and the arrangement being such that said valve is adapted to serve as a manual control of said motor for venting said vacuum chamber to lower said one end of said conduit by action of said spring means to one position within said reservoir and to apply a vacuum to said chamber and exert differential pressures on said diaphragm for raising said one end of said conduit to a higher position in said reservoir.

References Cited in the file of this patent

UNITED STATES PATENTS

| 931,071 | Livingston | Aug. 17, 1909 |
| 1,416,886 | Schreiner | May 23, 1922 |
| 2,112,393 | Burch et al. | Mar. 29, 1938 |
| 2,153,519 | Horton | Apr. 4, 1939 |
| 2,961,834 | Getz | Nov. 29, 1960 |

OTHER REFERENCES

Mickelmann, abstract of application Serial No. 411,177, published June 1, 1943.